United States Patent
Francoeur et al.

(10) Patent No.: US 12,296,420 B2
(45) Date of Patent: May 13, 2025

(54) MILLING AND LASER DRILLING SYSTEM

(71) Applicants: Gary Francoeur, Southwick, MA (US); David A. Cimma, Granville, MA (US)

(72) Inventors: Gary Francoeur, Southwick, MA (US); David A. Cimma, Granville, MA (US)

(73) Assignee: CADENCE, INC., Staunton, VA (US)

( * ) Notice: Subject to any disclaimer, the term of this patent is extended or adjusted under 35 U.S.C. 154(b) by 1318 days.

(21) Appl. No.: 16/301,296

(22) PCT Filed: May 17, 2017

(86) PCT No.: PCT/US2017/033055
§ 371 (c)(1),
(2) Date: Nov. 13, 2018

(87) PCT Pub. No.: WO2017/201138
PCT Pub. Date: Nov. 23, 2017

(65) Prior Publication Data
US 2020/0316734 A1    Oct. 8, 2020

Related U.S. Application Data

(60) Provisional application No. 62/338,159, filed on May 18, 2016.

(51) Int. Cl.
| | |
|---|---|
| B23P 23/02 | (2006.01) |
| B23B 3/06 | (2006.01) |
| B23K 26/00 | (2014.01) |
| B23K 26/32 | (2014.01) |
| B23K 26/382 | (2014.01) |

(52) U.S. Cl.
CPC ............ B23P 23/02 (2013.01); B23B 3/065 (2013.01); B23K 26/0093 (2013.01); B23K 26/32 (2013.01); B23K 26/382 (2015.10)

(58) Field of Classification Search
CPC ......... B23B 39/02; B23B 3/065; B23P 23/02; B23K 26/382; B23K 26/0093; B23K 26/14; B23K 26/146; B23K 26/703
USPC ............ 219/121.67, 121.72, 121.82, 121.7, 219/121.71, 121.84, 121.6, 121.75, 159; 29/557, 56.5, 560, 888.01, 896.1; 409/201, 235, 131, 213, 73, 76; 483/1, 483/16, 10, 18, 19; 408/22, 701
See application file for complete search history.

(56) References Cited

U.S. PATENT DOCUMENTS

| | | | | |
|---|---|---|---|---|
| 7,538,296 | B2 * | 5/2009 | Elfizy | B23K 26/0884 |
| | | | | 219/121.7 |
| 8,487,207 | B2 * | 7/2013 | Nakajima | B23K 37/04 |
| | | | | 219/121.72 |
| 2006/0223686 | A1 * | 10/2006 | Wakazono | B23K 26/0093 |
| | | | | 29/560 |
| 2007/0116532 | A1 * | 5/2007 | Lewis | B21C 37/045 |
| | | | | 409/131 |
| 2007/0169325 | A1 * | 7/2007 | Jancso | B23C 5/16 |
| | | | | 29/56.5 |

(Continued)

Primary Examiner — Vy T Nguyen

(57) ABSTRACT

A method of manufacturing a component includes shaping a workpiece into a component having a desired shape and drilling a plurality of holes in said workpiece. The drilling includes continuously moving said workpiece and selectively operating a laser when said workpiece is at a predetermined position. The shaping and drilling occur in the same piece of equipment.

5 Claims, 6 Drawing Sheets

(56) References Cited

U.S. PATENT DOCUMENTS

| | | | |
|---|---|---|---|
| 2009/0314753 A1* | 12/2009 | Kosmowski | B23K 26/147 219/121.72 |
| 2010/0200551 A1* | 8/2010 | Nakajima | B23K 26/38 219/121.72 |
| 2016/0221118 A1* | 8/2016 | Yamashita | B23K 26/0608 |
| 2017/0057018 A1* | 3/2017 | Li | B23K 26/384 |

* cited by examiner

MILLING AND LASER DRILLING SYSTEM

CROSS REFERENCE TO RELATED APPLICATIONS

This application is a National Stage application of PCT/US2017/033055, filed May 17, 2017, which claims the benefit of U.S. Provisional Application No.: 62/338,159, filed May 18, 2016, both of which are incorporated by reference in their entirety herein.

BACKGROUND

The present disclosure relates to a manufacturing process and more particularly, to a unique system capable of performing a plurality of distinct manufacturing processes sequentially.

Various components are manufactured by first machining a piece of material into a desired shape, and then forming a plurality of holes therein. The holes may be intended to perform any sort of operation, such as to allow a cooling air flow there through, or as a filter to remove debris from a fluid stream. A common method of drilling such holes includes using a laser beam. A high power beam is focused on the material at a location where the hole is to be formed. The laser may be repetitively pulsed until the hole is drilled through the material. After completion of a single hole, the beam is refocused or the component is repositioned so that the laser beam is oriented at another location on the component to drill the next hole.

When manufacturing a component having a substantial number of holes, performing a laser drilling process can take an extended period of time. Further, the milling or forming of a material into a desired shape to form a component occurs at a separate piece of equipment from the laser drilling. As a result, manufacturing of such components not only requires excess space to house a plurality of different pieces of manufacturing equipment, but also additional time to load and unload the component into each piece of machinery and to transport the component between pieces of equipment.

SUMMARY

According to one embodiment, a method of manufacturing a component includes shaping a workpiece into a component having a desired shape and drilling a plurality of holes in said workpiece. The drilling includes continuously moving said workpiece and selectively operating a laser when said workpiece is at a predetermined position. The shaping and drilling occur in the same piece of equipment.

According to another embodiment, an assembly including a turn-milling machine configured to mill a workpiece into a component having a desired shape. The turn-milling machine includes a spindle for movably supporting the workpiece. A laser is associated with the turn-milling machine. The laser is arranged such that a beam emitted by the laser intersects the workpiece. The laser is selectively operated as the workpiece continuously moves to form a plurality of holes in the workpiece.

According to yet another embodiment, a method of forming a component includes determining a configuration of a component to be formed from a workpiece. The configuration including a position of a plurality to holes to be formed in the workpiece. Position data indicating a position of the workpiece and the configuration of the component is provided to an algorithm. The algorithm being configured to determine a movement of the workpiece and corresponding operation of a laser to form each of the plurality of holes.

According to another embodiment, a control system includes a position sensor configured to indicate a position of a workpiece and a program configured to automatically determine a configuration of a component including a plurality of holes to be formed in the workpiece in response to a plurality of inputs. An algorithm executable by the processor is configured determine movement of the workpiece and corresponding operation of a laser to form each of the plurality of holes. A controller including a processor, the controller being operably coupled to the position sensor, the program, and the algorithm, wherein the controller is configured to continuously move the workpiece and selectively operate the laser in response to said algorithm.

BRIEF DESCRIPTION OF THE FIGURES

The accompanying drawings incorporated in and forming a part of the specification embodies several aspects of the present invention and, together with the description, serves to explain the principles of the invention. In the drawings.

The detailed description explains embodiments of the invention, together with advantages and features, by way of example with reference to the drawings.

DETAILED DESCRIPTION

Figure 1:
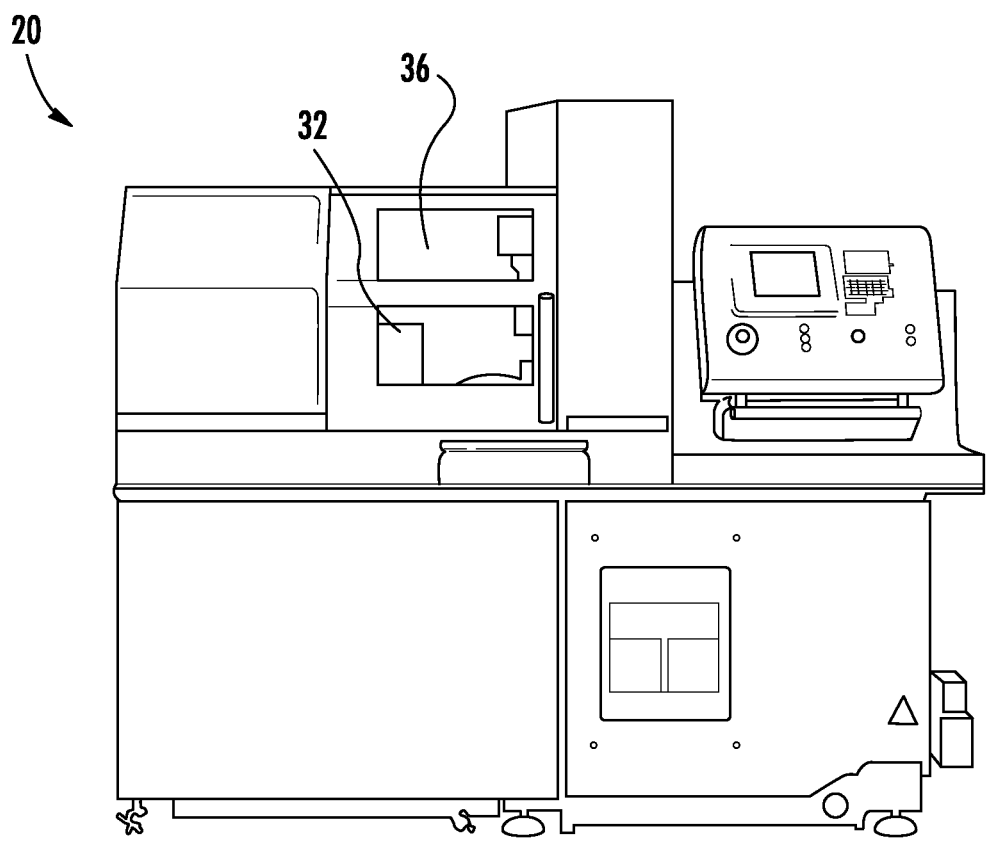
FIG. 1 is a front view of an example of a conventional turn-milling machine.
Figure 2:
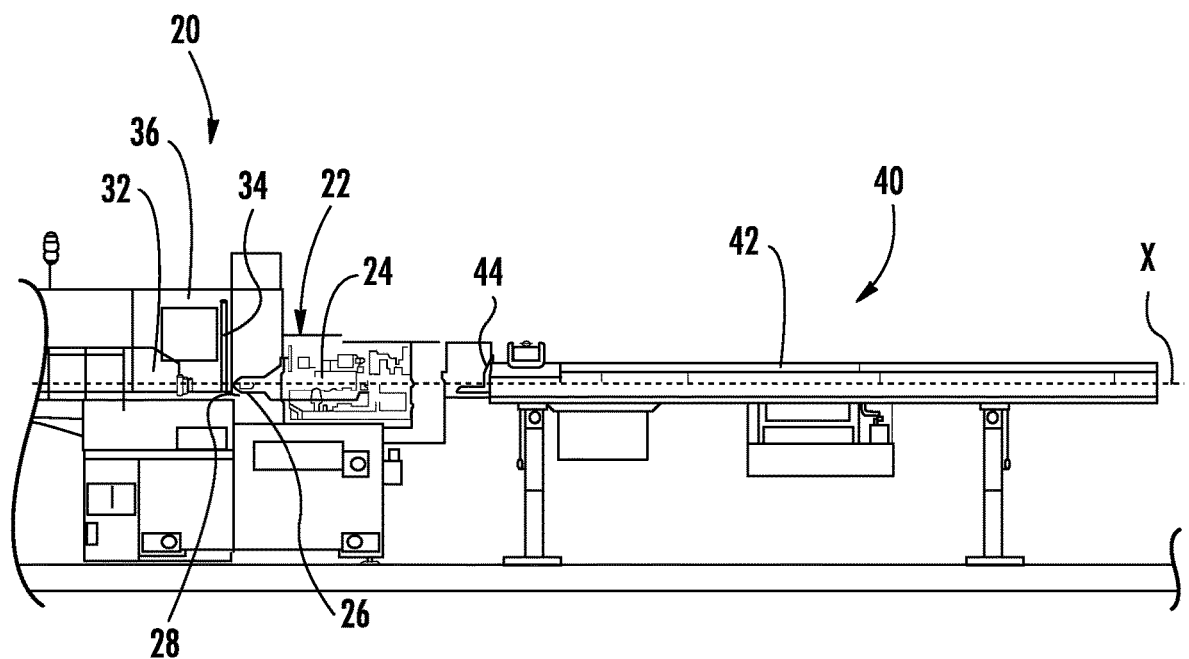
FIG. 2 is a side view of a turn-milling machine and an associated bar feeder.
Figure 3:
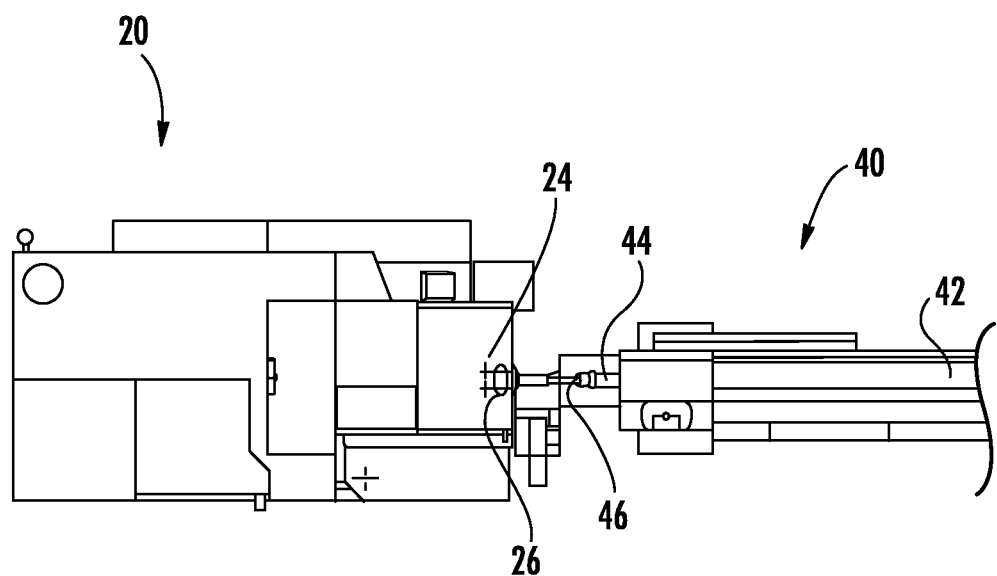
FIG. 3 is a top view of the turn-milling machine and associated bar feeder of FIG. 2.

Referring now to FIGS. 1-3, an example of a conventional automatic lathe or turn-milling machine 20 is illustrated. The machine 20 includes a headstock 22 including a hollow spindle 24 including a guide bushing. A motor operably coupled to the spindle 24 is configured to rotate and/or translate the spindle 24 about an axis. A chuck or collet 26 is provided at a first end 28 of the spindle 24 to grip a workpiece 30 (best shown in FIG. 4) during a machining operating performed by the system 20. A tailstock 32 may be arranged opposite the spindle 24 and may include a chuck or other means for gripping a free end of a workpiece 30. Typically the tailstock 32 is configured to translate and/or rotate about the axis. One or more processing tools 34 are typically arranged at a position between the headstock 22 and the tailstock 32, such as adjacent the first end 28 of the spindle 24 for example, and are configured to selectively engage the workpiece 30 as it is rotated and translated by the spindle 24. In some embodiments, as shown in FIG. 1, the headstock 22, tailstock 32, and processing tools 34 may be contained within a chamber 36 such that all processing of the workpiece 30 occurs within the chamber 36. Examples of turn-milling machines, include but are not limited to a CNC lathe, a Swiss Type lathe, a Swiss Turn Lathe, a Turn/Mill Multitasking Center, and a Turning Machine, such as manufactured by Tsugami or Citizen Machinery Co., LTD for example.

In some embodiments, as shown in FIGS. 2 and 3, a bar feeder 40 may be used in conjunction with the machine 20 to continuously supply a workpiece to the machine 20. The bar feeder 40 is arranged adjacent an opposite end of the spindle 24. The bar feeder 40 has a generally rectangular, elongated body 42 within which a workpiece 30, such as a rod of raw material for example, may be positioned. The bar feeder 40 and the spindle 24 are arranged coaxially such that a feed rod 44 of the bar feeder 40 is configured to translate along the axis of the spindle 24 between a position separated from the spindle 24 to a positioned generally adjacent, in contact with, or within the spindle 24. A finger chuck 46, attached to a portion of the feed rod 44, such as a front end thereof, supports the workpiece 30 as it is provided to the spindle 24.

The bar feeder 40, which may be configured as either a hydrodynamic or hydrostatic bar feeder, pushes and supplies a workpiece 30 into the spindle 24 from the rear end of the spindle 24 by moving the feed rod 44 along the axis, in the direction of the spindle 24 while holding the workpiece 30 in the finger chuck 46. As a result, adjacent portions of the workpiece 30, or adjacent workpieces within the bar feeder 40, are processed sequentially. As each product is machined from a workpiece 30, the machine 20 creates a final cut to separate the formed part from the remainder of the workpiece or stock material 30. The machine 20 and bar feeder 40 illustrated and described herein are intended as an example only and other types of equipment and configurations thereof are contemplated herein.

The machine 20 and bar feeder 40 may be modified to form an assembly 50 capable of performing a plurality of manufacturing processes sequentially without requiring that the products being manufactured are manually moved or collected between processes. In an embodiment, the assembly 50 is configured to perform a milling operation and a laser drilling operation. With reference to FIG. 3, in the illustrated, non-limiting embodiment, a laser 52 is associated with the automatic lathe or other turn-milling machine 20. In an embodiment, the laser is a Ytterbium Fiber laser having a wavelength between 1050-1060. However, it should be understood that any laser suitable for use with the turn-milling machine 20 is within the scope of the disclosure. The laser 52 is arranged at any suitable location within the turn-milling machine 20, such as within the chamber 36 for example, such that a beam emitted by the laser 52 along a laser beam axis, illustrated schematically by dotted line 54, is configured to intersect a portion of the workpiece 30, and in some embodiments, the axis about which the workpiece 30 extending from the spindle 24 rotates and translates.

The laser 52 is configured to perform a laser drilling operation. A laser drilling operation is distinguishable from a laser cutting operation. Laser cutting is typically performed by directing a laser beam through a series of optics of fibers to the workpiece being cut. The optics, commonly known as the "processing optic" delivers the laser beam to the workpiece as a sharp defined spot of a high energy density heat source configured to melt the material being cut. The laser focused spot melts the metal and a high pressure gas output from a nozzle arranged coaxially with the laser beam pushes or blows away the molten metal while the optics are moved via a CNC program or other means of mechanical movement. During a laser cutting operation, the laser is typically on or energized for extended periods of time to make different geometries cuts by moving the optics to create varied shapes. Laser cutting, is typically limited to geometries having a diameter greater than 0.03 inches.

During a laser drilling operation, the laser 52 is intermittently operated to emit laser pulses that intersect the workpiece 30 to create a hole in a wall thereof. In an alternate embodiment, the laser 52 may be operated to form a thru hole comprising two substantially identical holes formed on opposing sides of the workpiece 30. Similar to laser cutting, the laser focused spot melts the metal and a high pressure gas pushes or blows away the molten metal where the laser is focused. The laser pulses typically used in a laser drilling operation are very short and are much quicker than trying to create the hole through a CNC cutting process. From a machine standpoint, laser drilling machines are typically setup to only perform a drilling operation, and not a cutting operation. In addition, the optics of each laser are typically setup for a certain size diameter and sometimes this diameter is not ideal for laser cutting. Also a different laser source, capable of more efficiently delivering pulses to drill the holes may be used.

Each hole may be formed by a single pulse of the laser, or alternatively, may be formed by several pulses of the laser at the same location on the workpiece. The hole size being formed is generally dictated by the size of the beam being emitted. The size of the holes formed during a laser drilling operation is typically equal to or greater than at least 0.0005 inches in diameter. During a laser drilling operation, the laser 52 typically remains stationary and the workpiece 30 is moved or rotated about an axis to achieve a relative motion. However, it should be understood that embodiments where the workpiece 30 is stationary and the laser beam axis is moved, or embodiments where both the workpiece 30 and the laser beam axis are moved are within the scope of the disclosure.

A hole may be formed through either of two distinct laser drilling operations: stop and fire, or on-the-fly. The stop and fire method is the more common process. During a stop and fire operation, the optic or material is moved to a position where the hole is to be placed, a brief halt or pause in motion occurs to allow time for the laser beam to fire a pulse or series of pulses, and then the optic or material is moved to apposition associated with another hole. This process continues to form a desired pattern. The repeated stops in the motion accumulate such that the stop and fire process and substantially slower than more advanced methods. On-the-fly drilling uses advanced motion control feedback and algorithms to control precisely the position, speed and pulse duration of a laser to drill a hole at a desired location. The continuous movement of the material or optic is accurately controlled to be able to drill holes "on the fly."

Figure 4:
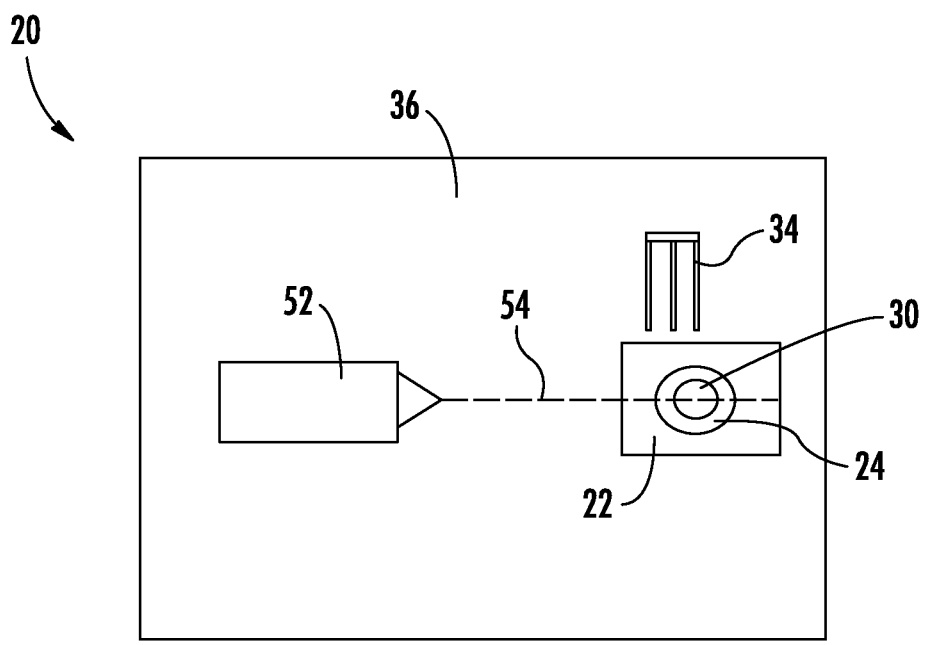
FIG. 4 is a schematic diagram of a front view of a headstock of a modified turn-milling machine assembly according to an embodiment.
Figure 5:
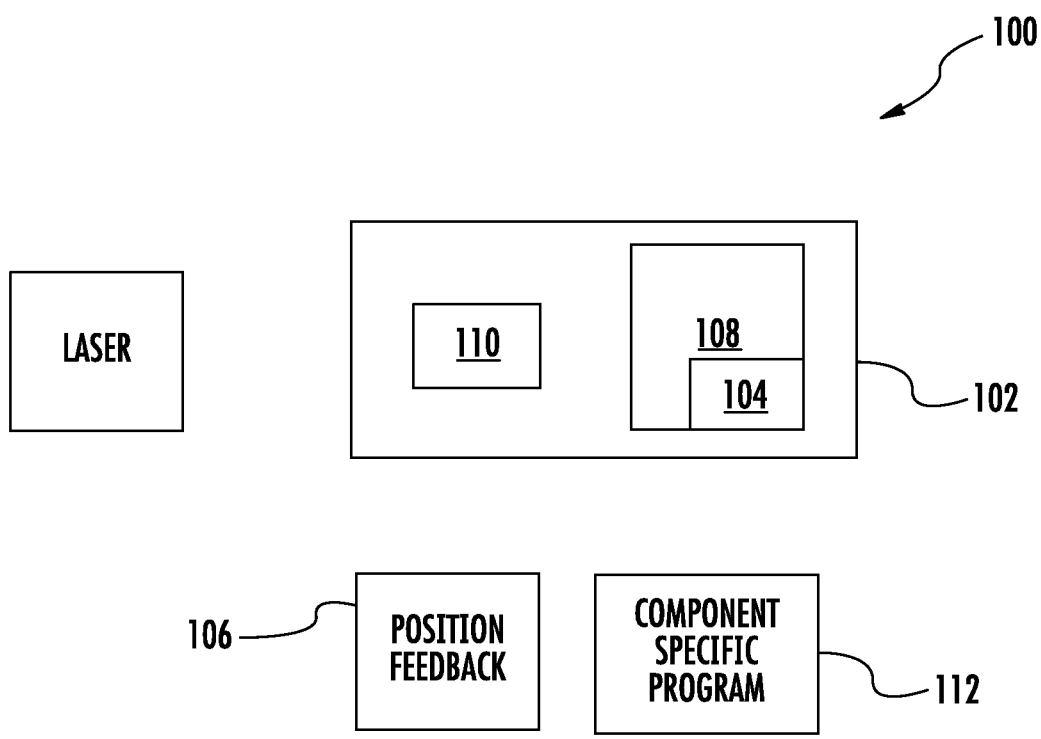
FIG. 5 is a schematic diagram of a control system of the assembly of FIG. 4 according to an embodiment.

A schematic block diagram of a control system 100 associated with operation of the assembly 10 during both a milling and laser drilling operation according to an embodiment is illustrated in FIG. 4. As illustrated, the system 100 includes a controller 102 that executes instructions for implementing an algorithm 104 for moving the spindle 24 and selectively energizing the laser 52 to form one or more holes in the workpiece 30. The computer 100 may receive real-time information from one or more sensors 106, such as position sensors or an encoder associated with the motor configured to monitor the position of the spindle 24, and therefore the workpiece 30. Controller 102 includes a memory 108 that communicates with a processor 110. Memory 108 may store an algorithm 104 as executable instructions that are executed by processor 110. The instructions may be stored or organized in any manner and at any level of abstraction, such as in connection with the execution of the algorithm 104. Processor 110 may be any type of processor (such as a central processing unit ("CPU") or a graphics processing unit ("GPU")), including a general purpose processor, a digital signal processor, a microcontroller, an application specific integrated circuit ("ASIC"), a field programmable gate array ("FPGA"), or the like. Also, in embodiments, memory 108 may include random access memory ("RAM"), read only memory ("ROM"), or other electronic, optical, magnetic, or any other computer readable medium onto which is stored algorithm.

To operate the assembly 50 such that multiple manufacturing operations are performed sequentially without interruption, a user enters one or more inputs into an algorithm or program 112. Examples of inputs to be provided to the program 112 include, but are not limited to, a major diameter, a minor diameter, a total number of holes, and the size of a spacing or web between holes for example. It should be understood that the type of inputs required may vary based on the type and/or shape of the component being manufactured. The algorithm or program 112 is configured to determine a configuration of the component, including a location of each of the plurality of holes formed about the periphery of the component body. Further, the algorithm 112 is configured to identify a position of the workpiece 30 associated with each hole or opposing pair of holes to be formed.

After performing a milling operation, the processor 110 is configured to access both the real-time sensor data 106, indicating a position of the workpiece 30, and the configuration information generated by program 112, identifying the position of each hole about the body. This sensor information and configuration information is provided as an input to the algorithm 104 executable by the processor 110. The algorithm 104 uses this information to determine the necessary movement of the workpiece 30 and corresponding times for pulsing the laser 52 and the length of each pulse to form each of the holes. Based on the algorithm 104, the controller 102 drives continuous movement of the workpiece 30 (rotation and translation) via the motor and intermittent pulsing of the laser 52 to perform an "on the fly" laser drilling operation within the milling machine 20. Although the controller 100 is described as performing a laser drilling operation after a milling operation, embodiments where the laser drilling operation occurs before a milling operation are also considered within the scope of the disclosure.

Figure 6:
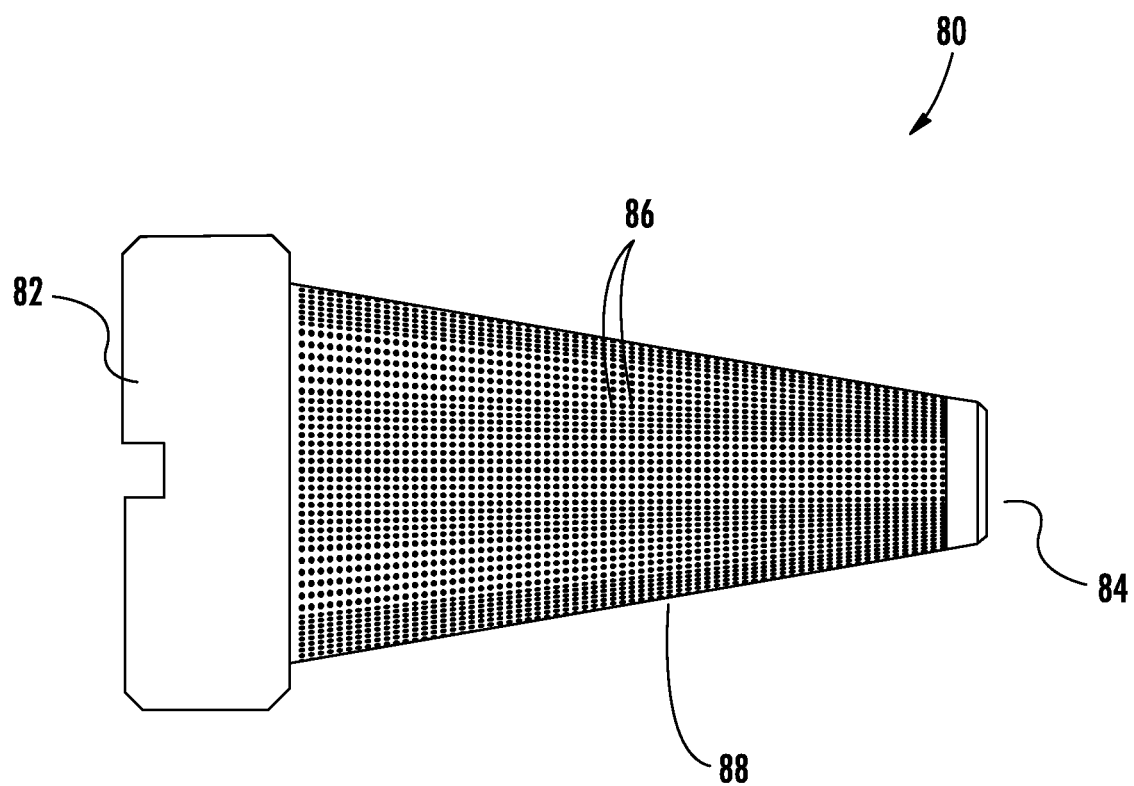
FIG. 6 is a side view of an example of a last chance filter fabricated via the modified turn-milling machine.

An example of a product 80 that may be formed via the assembly 50 is illustrated in FIG. 6. The product 80 is a last chance filter, which is typically installed immediately upstream of, or at an entrance to, a critical component, such as a nozzle or valve for example, to prevent contaminants or debris within a fluid system from entering and affecting operation of the critical component. Last chance filters 80 are generally used as a supplement to a standard filtration system. In the illustrated, non-limiting embodiment, the last chance filter 80 includes a first end 82 having a first diameter and a second, opposite end 84 having a second diameter. The first diameter is larger than the second diameter such that the filter 80 is generally conical in shape. The filter 80 typically has thousands of small holes 86 positioned about the body 88 thereof. The total number, size, and position of the holes 86 will vary based on the flow and filtration needed for an intended application.

Conventional last chance filters 80 are formed by machining a piece of raw material, such as bar stock for example, into a desired shape and then transporting the shaped piece to a separate laser drilling machine. The laser drilling machine operates by energizing the laser when the workpiece is held stationary in a desired position. The orientation of the workpiece relative to the laser is then adjusted, such that the workpiece is located at a new relative position and the laser is again operated to form a thru-hole. By using the assembly 50 described herein to both machine and laser drill a component, the need for manual intervention to relocate parts, and the time associated therewith, are eliminated. Further, by adapting the laser drilling system to operate "on the fly," a drilling process which would typically require hours of time may be reduced to mere minutes.

In addition, some conventional lathes or turn-milling machines typically include a flow of coolant, such as air or other suitable fluids for example, within the chamber 36, to prevent the machine 20 or the workpiece from overheating during the milling operation. In such embodiments, the laser 52 positioned within the enclosure 36 having a coolant flow includes optics that are waterproof or are otherwise adapted to withstand the coolant flow. By adapting the milling machine 20 to perform the laser drilling operation, the coolant flow may be used during the laser drilling operation, which will aid in the removal of contaminants and debris that may collect within the component during the drilling operation. As a result, the need for a separate cleaning operation after the drilling is completed may be eliminated. Therefore, the assembly 50 may be configured to perform a milling operation, a laser drilling operation, and additionally, a cleaning or deburring operation. Alternatively, another milling operation could be performed after the laser drilling operation to remove debris from the component. Further, a second laser drilling operation, such as at lessor laser energy for example, may be used to perform a final cleanup of the formed holes. The precision of the machine 20 and the efficiency of the software feedback associated with the laser drilling operation provides the ability to infinitely "re-drill" at precisely the same location of the original hole, for example to perform shaping and debris removal operations.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments of this invention are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of manufacturing a component comprising:
   translating, along a predetermined axis, a feed rod from a bar feeder, wherein a finger chuck is attached to a portion of the feed rod and wherein the finger chuck supports a workpiece, the bar feeder being arranged coaxially with a spindle;
   shaping, by performing a milling operation, the workpiece into the component having a desired shape while rotating and/or translating, by the spindle, the workpiece about the predetermined axis; and
   drilling a plurality of holes in said workpiece while rotating and/or translating, by the spindle, the workpiece about the predetermined axis, wherein said drilling includes continuously moving said workpiece and selectively operating a laser when said workpiece is at a predetermined position, said shaping and drilling occurring in the same piece of equipment, wherein
   in order to continuously supply, by the bar feeder, the workpiece to a machine performing the milling operation, the bar feeder and the spindle are arranged coaxially such that the feed rod of the bar feeder is configured to translate along the predetermined axis that is coaxially with an axis of the spindle, between a position separated from the spindle to a position adjacent, in contact with, or within the spindle.

2. The method of claim 1, wherein said shaping and drilling occur sequentially, without interruption.

3. The method of claim 1, further comprising cleaning the component via a coolant flow to remove debris and contaminants therefrom.

4. The method of claim 1, further comprising providing a coolant system directing a flow of coolant over the workpiece during shaping and drilling.

5. The method of claim 1, wherein the laser comprises waterproof optics.

* * * * *